US007639271B2

(12) United States Patent
McClellan

(10) Patent No.: US 7,639,271 B2
(45) Date of Patent: Dec. 29, 2009

(54) LABELING AN OPTICAL DISC

(75) Inventor: Paul J. McClellan, Bend, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1099 days.

(21) Appl. No.: 10/836,167

(22) Filed: Apr. 30, 2004

(65) Prior Publication Data

US 2005/0243338 A1 Nov. 3, 2005

(51) Int. Cl.
*B41J 2/435* (2006.01)
*B41J 2/47* (2006.01)
(52) U.S. Cl. ...................... 347/224; 347/251
(58) Field of Classification Search ................. 347/224, 347/251
See application file for complete search history.

(56) References Cited

U.S. PATENT DOCUMENTS

| 4,066,268 | A | | 1/1978 | Borchard et al. |
| 4,246,614 | A | * | 1/1981 | Knox ........................ 358/3.24 |
| 4,562,567 | A | * | 12/1985 | Frankfort et al. ............ 369/106 |
| 4,967,286 | A | | 10/1990 | Nomula et al. |
| 5,317,337 | A | | 5/1994 | Ewaldt |
| 5,737,481 | A | * | 4/1998 | Gushima et al. ............. 386/113 |
| 5,781,221 | A | * | 7/1998 | Wen et al. .................... 347/232 |
| 5,828,814 | A | * | 10/1998 | Cyman et al. ................ 358/1.2 |
| 6,019,151 | A | | 2/2000 | Wen et al. |
| 6,074,031 | A | * | 6/2000 | Kahle ............................ 347/4 |
| 6,229,923 | B1 | * | 5/2001 | Williams et al. ............ 382/224 |
| 6,264,295 | B1 | | 7/2001 | Bradshaw et al. |
| 6,283,019 | B1 | * | 9/2001 | Dolves ....................... 358/3.29 |
| 6,512,535 | B1 | | 1/2003 | Nagasaka et al. |
| 2002/0097895 | A1 | * | 7/2002 | Marshall et al. ............. 382/117 |
| 2003/0194214 | A1 | | 10/2003 | Anderson et al. |

FOREIGN PATENT DOCUMENTS

| JP | 2000-292934 | 10/2000 |
| JP | 2002-251862 | 9/2002 |
| JP | 2003-242750 | 8/2003 |

OTHER PUBLICATIONS

Office Action for Japan Patent App. No. 2005-110726 dated Dec. 12, 2006 With English Translation (5 pages).

* cited by examiner

*Primary Examiner*—Stephen D Meier
*Assistant Examiner*—Sarah Al-Hashimi

(57) ABSTRACT

Methods for generating a curved raster image are disclosed. The method includes providing a rectangular raster image, defining a curved raster geometry and coordinate system on a curved track, thus forming a curved raster, and tracing along the curved raster to define a plurality of data locations. The method further includes computing curved raster data for each of the plurality of data locations from the rectangular raster image, thus creating the curved raster image.

40 Claims, 5 Drawing Sheets

LABELING AN OPTICAL DISC

BACKGROUND OF THE INVENTION

Computer users employ writable and rewritable optical discs for a variety of different purposes. They may save programs or data to the discs such as for archival or distribution purposes. In the case of CD-type discs, users may make music CDs that can be played in audio CD players, or save music data files to the CDs, such as MP3 files, that can be played in special-purpose CD players. In the case of DVD-type discs, users have greater storage capacity than with the CD-type discs and may be able to make video DVDs that can be played in stand-alone DVD players.

Optical discs include a data side and a label side. The data side is where the programs and the data are written, and the label side allows the user to label the optical disc. However, labeling can be a laborious or even an expensive process that results in an unprofessional looking label. For instance, markers can be used to write on the label side of optical discs, but the results look unprofessional. Special pre-cut labels can also be printed with inkjet or other printers, but this is a labor-intensive process, as the labels must be carefully aligned on the discs and, if the labels are not properly placed on the disc, the label may even damage the disk drive.

Some labeling mechanisms label the disc using horizontal sweeps with either the labeling mechanism or the disc being incrementally moved between sweeps. Such mechanisms are typically separate from, or add significant incremental cost to, the optical disc drive that writes the data or programs to the disc.

Other radially oriented labeling mechanisms rotate and mark the circularly shaped disc at different linear velocities depending on the distance of a mark from the center of rotation of the disc. For example, when the circularly shaped disc rotates at a constant velocity, the center of the disc rotates at a slower speed than the outer edge of the disc.

The difference in linear velocities often results in varying tangential labeling resolutions at different distances from the center of rotation, and thus distortion of the resulting labeled image.

In some radially oriented labeling mechanisms, the source label image is manipulated or converted from a rectangular coordinate pattern to an angular coordinate system. The particular method used to convert the rectangular coordinate pattern to an angular coordinate system can also introduce distortions in the label. Existing disc labeling systems have converted the source label image from rectangular coordinates to polar coordinates, consisting of a distance from the center of rotation of the disc and an angle of rotation. However, a fixed precision polar coordinate system causes the marking resolution to decrease as the distance from the center of rotation increases.

BRIEF SUMMARY OF THE INVENTION

The embodiments of the invention described herein include methods and an apparatus used to convert a rectangular raster image to a curved raster image. The conversion methods described herein enable a source image to be displayed on a circular medium, while minimizing distortion of the image on the circular medium.

In one embodiment, a method for converting a source rectangular raster image to a curved raster image is described. The method includes defining a curved raster geometry and coordinate system on a curved track, thus forming a curved raster and tracing the curved raster. The method further includes computing curved raster data from the source rectangular raster image and creating the curved raster image.

BRIEF DESCRIPTION OF THE SEVERAL VIEWS OF THE DRAWINGS

While the specification concludes with claims particularly pointing out and distinctly claiming that which is regarded as the present invention, the advantages of this invention may be more readily ascertained from the following description of the invention when read in conjunction with the accompanying drawings in which:

DETAILED DESCRIPTION OF THE INVENTION

Figure 1:
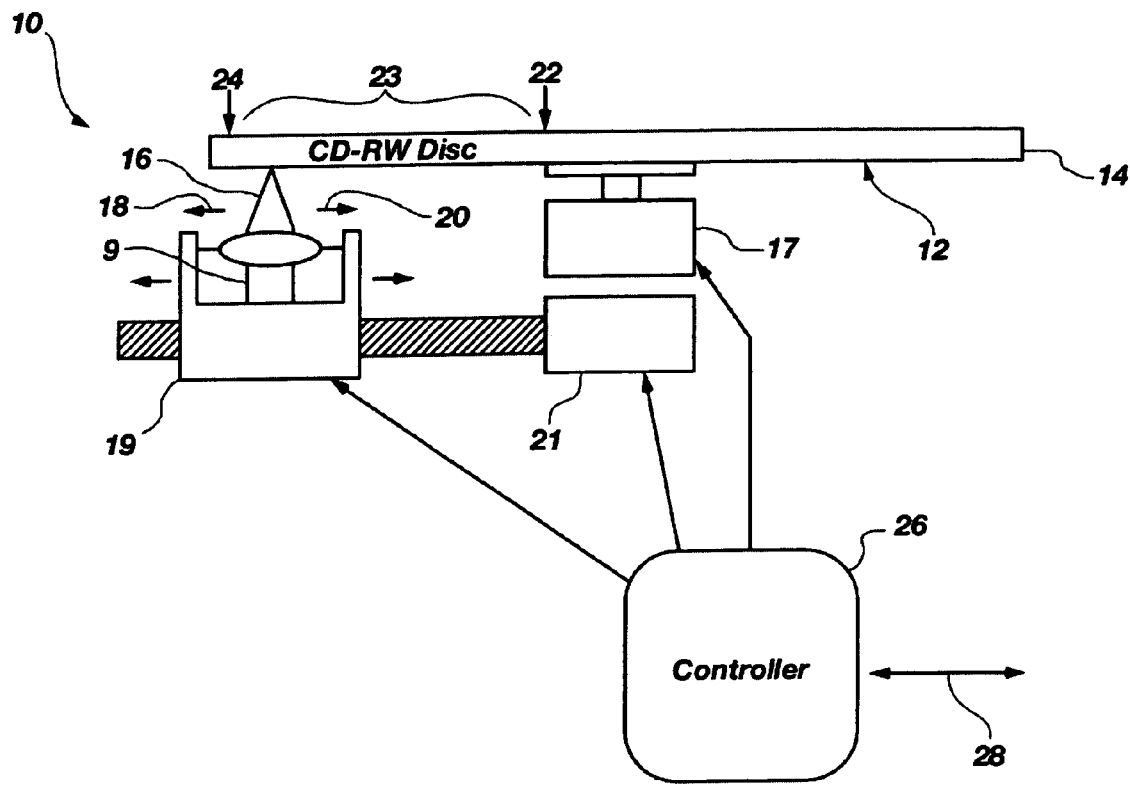
FIG. 1 is a schematic representation of one embodiment of an optical disc labeling system of the present invention.

Referring now to FIG. 1, one embodiment of an optical disc labeling system of the present invention is shown generally at 10. The optical disc labeling system 10 may be used to create an image on a label side 12 of an optical disc 14, such as a CD or DVD, by marking a surface of the label side 12 of the optical disc 14 with a laser beam 16 that is generated by a light source 9. An opposite side of the optical disc 14, although not illustrated, is a data side where data is written and stored.

The optical disc labeling system 10 forms an image on a surface of the label side 12 of the optical disc 14 with the laser beam 16. In forming the image, the laser beam 16 is radially moved in relation to the optical disc 14 such that a curved track or raster, such as a continuous spiral track or a set of concentric circular tracks is traced along the optical disc 14.

The source rectangular raster images that may be used to form the label on the optical disc 14 may be represented as pixels, i.e., picture elements, in a rectangular pattern. The pixels of the source rectangular raster image are arranged in a rectangular array of rows and columns, wherein each pixel has a uniform spacing and orientation with respect to the other pixels of the source image. Alternatively, the source rectangular raster image pixels may be specified in rectangular form.

To maintain a constant marking resolution throughout the disc label region, the data for labeling the disc may be arranged as a curved raster with geometry specified by a radial-tangential system, which includes a distance from the center of rotation and a tangential distance along the marking trajectory as a sled 19 is moved and the disc 14 spins. The geometry of this marking trajectory is defined such that a fixed precision radial-tangential coordinate system can cover the label region at constant marking resolution.

In one embodiment, the geometry includes a continuous spiral trajectory where the marks are made at uniformly spaced marking locations along the continuous spiral trajectory. In another embodiment, the geometry includes a set of uniformly spaced, concentric circles where the marks are made at uniformly spaced marking locations along the uniformly spaced, concentric circles. Either of these methods is well suited to using a sled-mounted laser with rotating disc. The marking data associated with the continuous spiral or sequence of concentric circles represents a curved raster image.

The data describing each source rectangular raster image pixel may be arranged in a rectangular array, i.e., a plane, wherein each pixel data element describes the corresponding pixel. In one embodiment, the source rectangular raster image pixel data may be arranged in multiple planes where each plane represents a single color component of the rectangular array of pixels. In another embodiment, each plane of the source rectangular raster image data may represent a single data bit of a specific color component of the rectangular array of pixels. Other embodiments may employ planes having different resolutions or implied spacings between data elements. Regardless of the pixel data spacing, a one-to-one correspondence exists between the position of the pixel data in each plane and the geometry of the rectangular array of pixels in the source rectangular raster image.

In forming the image on the label side of the optical disc 14, software associated with the optical disc labeling system 10 converts the source rectangular raster image having the rectangular pattern of pixels to the marking locations of the curved track generated by the optical disc labeling system 10, i.e., the continuous spiral track or the set of concentric circular tracks of the optical disc 14. Each marking location corresponds to a uniformly spaced interval along the curved track. The optical disc labeling system 10 computes a representative value for each of the marking locations on the curved track from one or more corresponding pixels of the source rectangular raster image.

To record the image on the optical disc 14, the optical disc labeling system 10 causes the laser beam 16 to trace the curved track by rotating the optical disc 14 and causing the laser beam 16 to follow the geometry of the curved track generated by the optical disc labeling system 10. When the laser beam 16 encounters a marking location of the curved track that corresponds to a pixel of the source rectangular raster image as determined by the optical disc labeling system 10, the optical disc labeling system 10 causes the laser beam 16 to form a mark at the marking location on the optical disc 14, thus, imparting label formation on the optical disc 14.

In this manner, the necessary marking data for each track is selected and available for marking control by the optical disc labeling system 10. The marking control refers to the ability of the optical disc labeling system 10 to form a mark or not form a mark at the various marking locations of the curved track generated by the optical disc labeling system 10. The method of computing the representative value may comprise a "nearest neighbor" source rectangular raster image pixel method, or an average or interpolation of neighboring source rectangular raster image pixels, each of which will be described in more detail herein.

The selection of the "nearest neighbor" source rectangular raster image pixel to represent the marking locations may be appropriate when the filtering operation associated with averaging or interpolation of neighboring source image pixels introduces objectionable artifacts in the printed image. In other instances, the averaging or interpolation of neighboring source image pixels may be appropriate when the source image is smooth (i.e., has low spatial frequencies, such as when a single marking location of the curved track used to form the label represents a region of multiple source image pixels) or when a more accurate or less noisy estimate of the image source at the marking position is required.

The optical disc labeling system 10 causes the laser beam 16 to place marks on the optical disc 14 by moving the sled 19 radially in relation to the optical disc 14, indicated with arrows 18 and 20, along an imaging region 23 of the optical disc 14, and by controllably modulating the laser beam 16 when the beam is adjacent the desired marking locations. The imaging region 23 is the region of the optical disc 14 between an inner radius 22 of the optical disc 14 and an outer radius 24 of the optical disc 14. The angular positioning and movement of the optical disc 14 is controlled with a device for positioning and moving the optical disc 14, such as a disc spindle motor 17. The optical disc labeling system 10 generates and sends a sequence of control signals with a controller 26 that controls the disc spindle motor 17, the positioning of the sled 19, and the modulation of the laser beam 16 during the labeling process. The controller 26 may receive a rasterized image (not shown) from an interface 28 of a computer system (not shown) or from another source.

Figure 2:
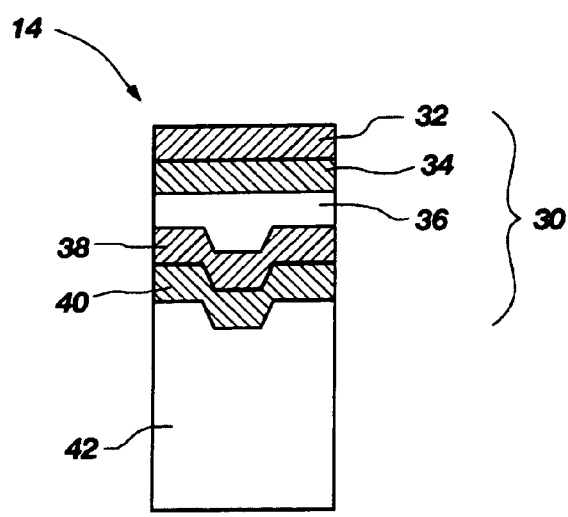
FIG. 2 is a partial cross-section of one embodiment of an optical disc used with the optical disc labeling system of FIG. 1.

Referring to FIG. 2, there is shown a partial cross-section of one embodiment of the optical disc 14 of FIG. 1 that may have monochromatic marks placed thereon with the laser beam 16. The optical disc 14 of FIG. 2 includes a number of layers that make up a label surface 30. The label surface 30 includes a protective lacquer layer 32 that acts as a protective coating and covers an imaging layer 34. The imaging layer 34 may include: an antennae infrared dye, which absorbs laser energy and converts the laser energy to heat; an activator having activator and dye crystals that melt from the heat produced from the antennae infrared dye; and a thermochromic dye that initiates a chemical reaction from the heat and, as a result of the chemical reaction, changes color. The optical disc 14 further includes a clear, protective coating 36, a reflective/thermal layer 38, a dye data layer 40, and a polycarbonate substrate 42.

In one embodiment the optical disc labeling system 10 may be integrated into a computer system as a peripheral device that is directly attached to a computer or recording (host) system. In this manner, the optical disc labeling system 10 may be added to an existing computer system. In other embodiments, an existing disc writing architecture of an operating system (OS) may be retro-fitted with a software application to perform the optical disc labeling methods described herein. For instance, an existing disc writing architecture of the operating system may be configured to communicate with the optical disc labeling system 10 via an SCSI Multimedia Command Set over a transport protocol, such as the ATAPI transport protocol. The software application may be stored or placed on a computer-readable storage medium as a computer readable code that, when read and executed by the computer, causes the computer and, thus, the optical disc labeling system 10 to perform the functions described herein. The computer-readable storage medium may comprise any optical, magnetic, or solid-state storage medium that is read by the computer.

The optical disc labeling system 10 forms the image as the label on the optical disc 14 by marking the label surface 30 (FIG. 2) at specified marking locations with the laser beam 16 to produce the uniformly sized marks. Other marking locations may not be marked by the laser beam, but left unmarked. A path followed by the laser beam 16 is moved in relation to the optical disc 14 such that it follows the curved track(s), which may be the continuous spiral track or the set of concentric circular tracks. It is more efficient in items of print time to follow curved track(s) than conventional rectangular tracks. The optical disc labeling system 10 generates a geometry of the curved track(s) and computes marking locations from representative values of pixels from the source rectangular raster image, such that marks may be placed at appropriate marking locations along the curved track for creating the label.

In one embodiment, the label image is produced using halftoning methods to achieve perceptually continuous and uniform tones via the marks formed on the optical disc 14. The optical disc labeling system 10 produces halftones that are obtained from the source rectangular raster image's rectangular array of pixels. The optical disc labeling system 10 places the halftoned result onto the optical disc 14 following a geometry of curved tracks, while taking care not to distort spatial frequency components of the halftoned image from the source rectangular raster image.

The optical disc labeling system 10 of FIG. 1 controls the optical disc 14 positioning with the disc spindle motor 17. The optical disc labeling system 10 may rotate the optical disc 14 at constant angular velocity (CAV) or track constant linear velocity (CLV). When the optical disc 14 is rotated at CLV, the angular velocity is inversely proportional to the radial position of the laser beam 16 in relation to the optical disc 14. When the optical disc 14 is rotated at CAV, the laser beam 16 is pulsed at a rate proportional to the radial position of the laser beam 16 in relation to the curved tracks of the optical disc 14. Whether rotated at CAV or CLV, the placement of the marks on the label surface 30 along a curved track or tracks is uniformly spaced.

The marking of the label surface 30 of the optical disc 14 is controlled by arranging marking data in a sequence, i.e., raster. The marking data, as determined by the placement of marks, determines which marking locations along each track will be marked or not marked. The marking data is arranged in a curved raster sequence that corresponds to the manner in which the laser beam 16 is moved along each curved track. Thus, a one-to-one correspondence exists between the sequence of curved raster data and the locations of the marks placed on the optical disc 14 along the curved track generated by the optical disc labeling system 10. In one embodiment, fixed precision coordinates, such as those in a radial-tangential coordinate system, are used to determine the placement of the marks along the curved tracks.

The optical disc labeling system 10 may control the radial position of the laser beam 16 with a sled 19 associated With a sled motor 21, such as a DC servo or stepper motor. In one embodiment, the mode of operation of the optical disc labeling system 10 is CLV, since CLV is the method conventionally used by CD and DVD drives. In addition, label writing, laser positioning and firing control is simpler when CLV is used. However, in other embodiments, the optical disc labeling system 10 may be configured to use CAV.

Figure 3:
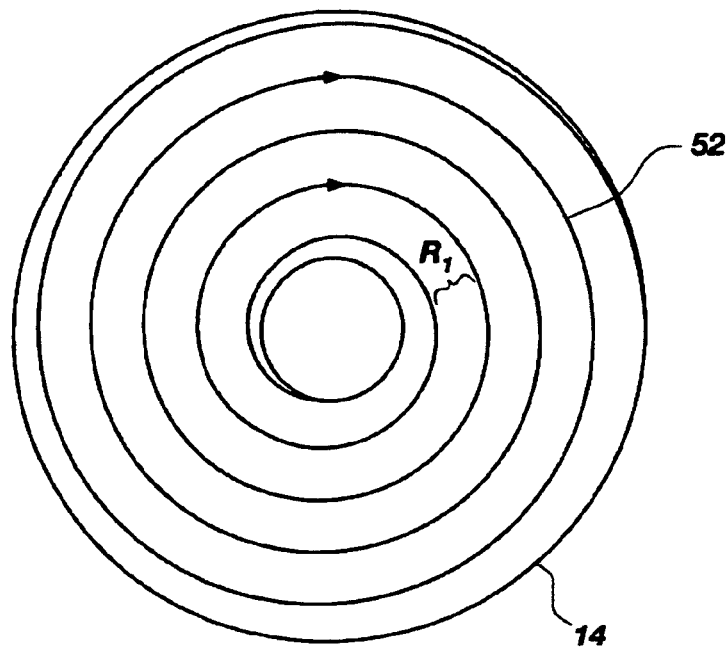
FIG. 3 is one embodiment of a continuous spiral track used to mark an optical disc of the present invention.

In one embodiment, the optical disc labeling system 10 labels an image onto the optical disc 10 by causing the path followed by the laser beam 16 to trace a continuous spiral track on the optical disc 14, and modulating the laser beam 16 at particular marking locations on the spiral track. Referring now to FIG. 3, there is illustrated one embodiment of a continuous spiral track 52 on an optical disc 14. The spacing between cycles of the continuous spiral track 52 is exaggerated in FIG. 3 for visual clarity and it will be apparent that the representation of the continuous spiral track 52 is not drawn to scale, but is merely illustrative. To create an image, or label, on the continuous spiral track 52, the laser beam 16 is continuously displaced along the radial direction as the optical disc 14 is rotated such that track spacing is moved during each cycle of the optical disc 14 rotation. The laser beam 16 traces or tracks along the continuous spiral track 52 continuously and, thus, non-printing scans between tracking cycles do not exist.

The geometry of the continuous spiral track 52 is selected such that a distance between tracks ($R_1$) of the continuous spiral track 52 increases a constant amount (track spacing) for each cycle (revolution) of the continuous spiral track 52. A uniform marking density is achieved by placing marks (not shown) at marking locations as determined by the optical disc labeling system 10 on the optical disc 14. The marking locations may have a symmetric shape and, by placing the marking locations at the same spacing along the continuous spiral track 52, intervals between the marking locations are substantially the same length. It will be apparent by those of ordinary skill in the art that no matter the shape of the mark, the radius of the continuous spiral track 52 and the spacing of marking locations along the continuous spiral track 52 may be tuned to the shape of the marking location.

A continuous spiral track 52 is generated by causing the optical disc labeling system 10 to incrementally change the radial position of the laser beam 16 is a substantially continuous manner as the optical disc 14 is rotated. If the optical disc 14 is rotated at CAV, the radial position of the laser beam 16 is incremented at a constant velocity. If the optical disc 14 is rotated at CLV, the radial position of the laser beam 16 is changed at a velocity that is inversely proportional to the radial position of the laser beam 16 in relation to the optical disc 14.

In another embodiment, the continuous spiral track 52 may be traced on the optical disc 14 with interruptions. In this embodiment, unmarked regions of the optical disc 14 may be skipped while the laser beam 16 is re-positioned and the optical disc 14 rotates in position. This embodiment may be reduce labeling time for some images.

Figure 4:
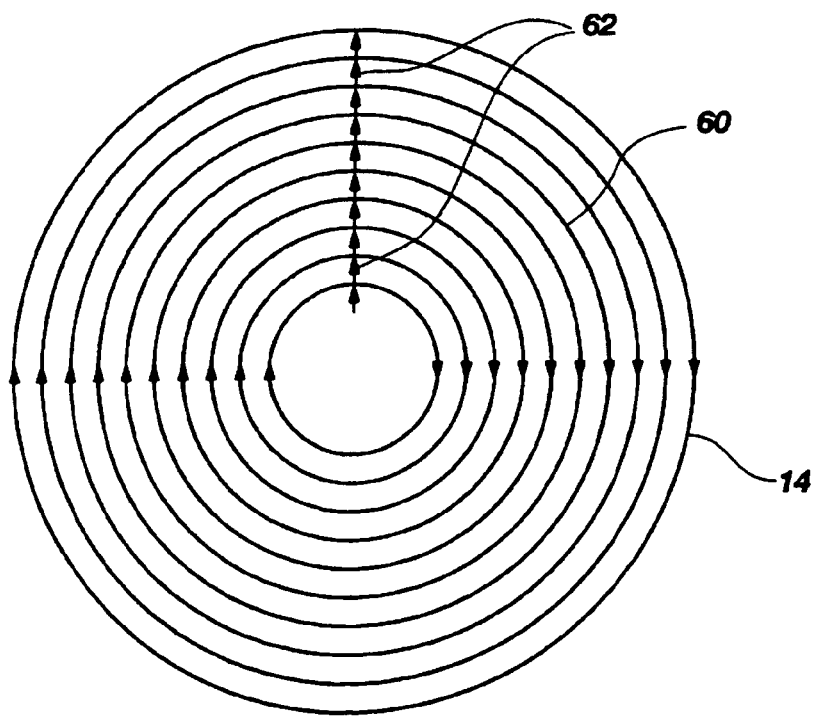
FIG. 4 is one embodiment of a sequence of concentric tracks used to mark an optical disc of the present invention.

In another embodiment, the optical disc labeling system 10 creates the image on the optical disc 14 by causing the laser beam 16 to trace a set of concentric circular tracks generated by the optical disc labeling system 10 on the optical disc 14, while modulating the radially movable marking device, such as the laser beam 16. Referring to FIG. 4, there is shown one embodiment of an optical disc 14 having a set of concentric tracks 60. For ease of illustration, the concentric tracks 60 of the optical disc 14 are not drawn to scale, the number of concentric tracks 60 is reduced, and the spacing between the concentric tracks 60 is increased. Since the optical disc 14 rotates counterclockwise when viewed from the writing side of the optical disc 14, the concentric tracks 60 are shown with clockwise arrows indicative of the direction in which marks can be made in adjacent marking locations.

To create a mark on one of the concentric tracks 60, in one embodiment the laser beam 16 is moved incrementally by one concentric track 60 at a time along the radial direction at the end of each cycle of rotation. If a radial displacement 62 of the laser beam 16 is performed in a substantially quick manner, the labeling on the concentric tracks 60 may be substantially continuous, having negligible, non-printing delays between formation of marks on the concentric tracks 60.

The substantially uniform marking density of the concentric circular tracks 60 is achieved by radially spacing the concentric tracks 60 a constant amount (i.e., track spacing). For instance, if the marks used to form the label on the optical disc 14 have a symmetrical shape and are placed directly along the uniformly spaced concentric tracks 60, a substantially uniform marking density is achieved. In other embodiments, the marks formed on the optical disc may have an asymmetrical shape. In these embodiments, the marks may be placed on concentric tracks 60 that have, at least partially, a varying radial track spacing between the concentric tracks to achieve the uniform marking density. Further, a deviation from substantially uniform spacing may occur at endpoints of the concentric tracks 60 where the track length may not be an exact integer multiple of the space between the marks.

Tracing a set of concentric tracks 60 may be performed by causing the optical disc labeling system 10 to incrementally move the radial position of the sled 19 and, thus, the laser beam 16 by one concentric track 60 and decreasing the spindle speed at the end of each cycle of rotation. If the optical disc 14 is rotated at CAV, the radial position of the laser beam 16 is incremented at a constant period. If the optical disc 14 is rotated at CLV, the radial position of the laser beam 16 is incrementally advanced at a period proportional to the radial position of the laser beam 16. In this manner, each mark placed on a concentric track will lie at substantially the same radial position such that the plurality of marks formed on the track, are spaced at substantially uniform time intervals when the optical disc is marked at a CLV. The tracks lacking data may be skipped by advancing the radial position of the laser beam 16 past the track without any data.

Whether the optical disc 14 is configured with concentric circular tracks 60 or a continuous spiral track 52, the marking locations along the track are specified in a coordinate system as generated by the optical disc labeling system 10. The marking positions along the track may be selected such that the precision among the coordinates of the coordinate system maps directly to the geometry of the tracks. In one embodiment, the concentric circular tracks 60 or the continuous spiral track 52 are defined in a coordinate system such as, for example, a radial-tangential coordinate system, wherein the distance between the marking locations is a constant length along the track in order to provide a substantially uniform print density.

After the rectangular raster image is converted to a curved raster image, a fixed track geometry and a referenced starting point are assigned to the curved track and used by the optical disc labeling system 10 to trace the shape of the curved track along the optical disc 14. The fixed track geometry refers to a predetermined shape having a predetermined dimension that is assigned to the curved track. A position (T) of a marking location on a track is ascertained by determining the distance the marking location lies from the starting track location along the length of the track. For instance, a number of substantially uniformly spaced marking locations comprising the continuous spiral track 52 may be selected.

In another embodiment, a substantially uniform marking density is achieved by fixing the number of tracks when concentric circular tracks 60 are used. For instance, a set of substantially uniformly spaced concentric circular tracks 60 and a concentric circular coordinate system (including the track number (R) and the distance along that track (T)) may be selected. In this embodiment, a fixed precision coordinate system is used to specify marking locations along the track where marks used to form the label are to be placed by the laser beam 16. The fixed precision coordinate system may be used to directly map the placement of the marks used to form, the label along the distance (T) of a track or tracks and linearly map the timing and the placement of the marks at CLV.

Figure 5:
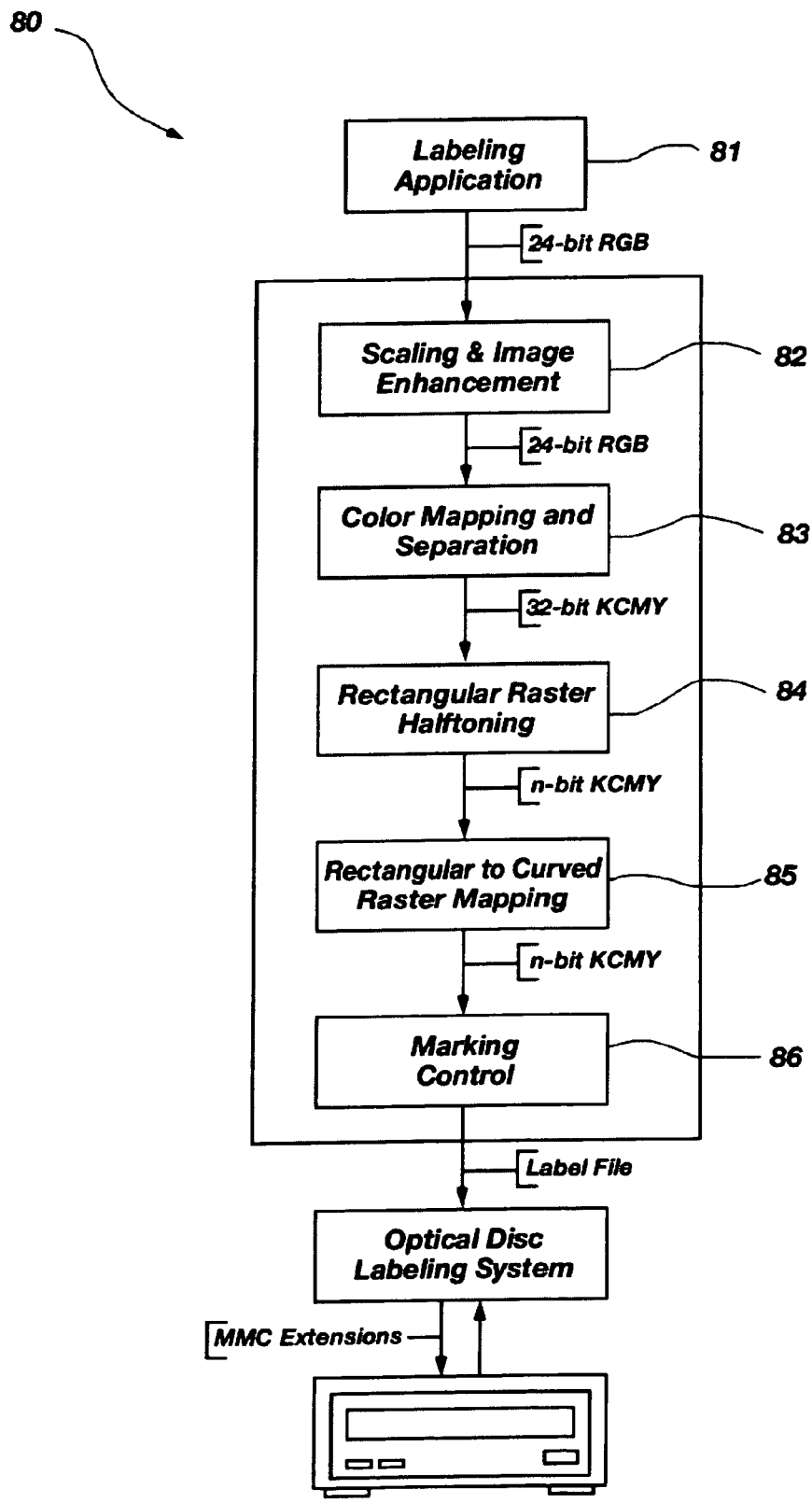
FIG. 5 is a functional block diagram of one embodiment of an imaging pipeline used by the optical disc labeling system of FIG. 1.

Referring now to FIG. 5, there is shown a functional block diagram illustrating one embodiment of an imaging pipeline of the optical disc labeling system 10, generally at 80. The imaging pipeline 80 of FIG. 5 processes a continuous tone rectangular image to produce a data stream, and controls the formation of the image onto the optical disc 14 by the optical disc labeling system 10 as the laser beam 16 follows a pattern of the concentric circular tracks 60 or the continuous spiral tracks 52 on the label side 12 of the disc 14.

The exemplary imaging pipeline 80 employed by the optical disc labeling system 10 is conceptually implemented as a series of processing stages. A labeling application at box 81 produces a rectangular RGB image, which is then scaled and enhanced at box 82. The colors of the rectangular image are mapped and separated into the printing color channels KCMY (black, cyan, magenta, and yellow) at box 83. The rectangular KCMY raster image is halftoned at box 84, in which the printing channels' continuous tones are replaced by discrete values representing the number of possible printing levels of the optical disc labeling system 10. In one embodiment, the system 10 provides two printing levels and thus binary values are produced during halftoning. At box 85, and as will be discussed subsequently in greater detail, the halftoned RGB rectangular raster graphic is converted or mapped to a curved raster, such as a set of concentric circular rasters or a continuous spiral raster, producing a data stream. At box 86, this data stream is formatted as laser control data and is augmented with mechanism control commands to control the optical disc labeling system's 10 formation of the label on an optical disc surface.

Considering now in greater detail, the conversion of the source rectangular raster image to the curved raster at box 85, a reasonable match between the source image resolution and the curved raster geometry and resolution are assumed. If the source rectangular raster image resolution is too low, the interpolation operations performed as part of the conversion of box 85 may not be able to make effective use of the higher resolution of the labeling system. In one embodiment, the source rectangular raster image resolution is matched to the track and mark spacing of the optical disc labeling system 10.

Binary printing can produce perceptually continuous tones when known matrix-based or stochastic (error diffusion) halftoning methods are utilized. Some methods push the halftoning errors to high spatial frequencies that humans find less objectionable than other lower spacial frequencies. In the imaging pipeline 80 of FIG. 5, such rectangular-based halftoning methods are used at box 84. These methods may be tuned to each specific optical disc marking process and media sets used by the optical disc labeling system 10.

In one embodiment of the conversion (box 85), the halftoned pixels are directly mapped to the curved rasters using a "nearest neighbor" selection process. In the "nearest neighbor" selection process, the optical disc labeling system 10 selects, for each curved raster marking location, the halftone pixel value in the rectangular array having a corresponding label position that is nearest, or closest, to the marking location of the curved track. This method does not interpolate between multiple halftoned data points in the array. Stated another way, in the nearest neighbor selection process, the value of the nearest rectangular raster image pixel is selected for each marking location on the curved track, wherein the selection of the nearest rectangular pixel may be biased in some direction for ties, i.e., a pixel of the rectangular image is near two marking locations on the curved track.

The nearest neighbor selection process enables halftoned rectangular source images to be printed onto the curved tracks without introducing objectionable artifacts into the resulting printed labels. Although some positioning errors may be introduced at the marking locations along the curved track, the halftoning is not defeated. In order for the nearest neighbor selection process to achieve representative sampling of the rectangular halftoned image on the curved tracks, the resolution of the rectangular source image should approximately match the resolution of the curved tracks for the label.

Figure 6:
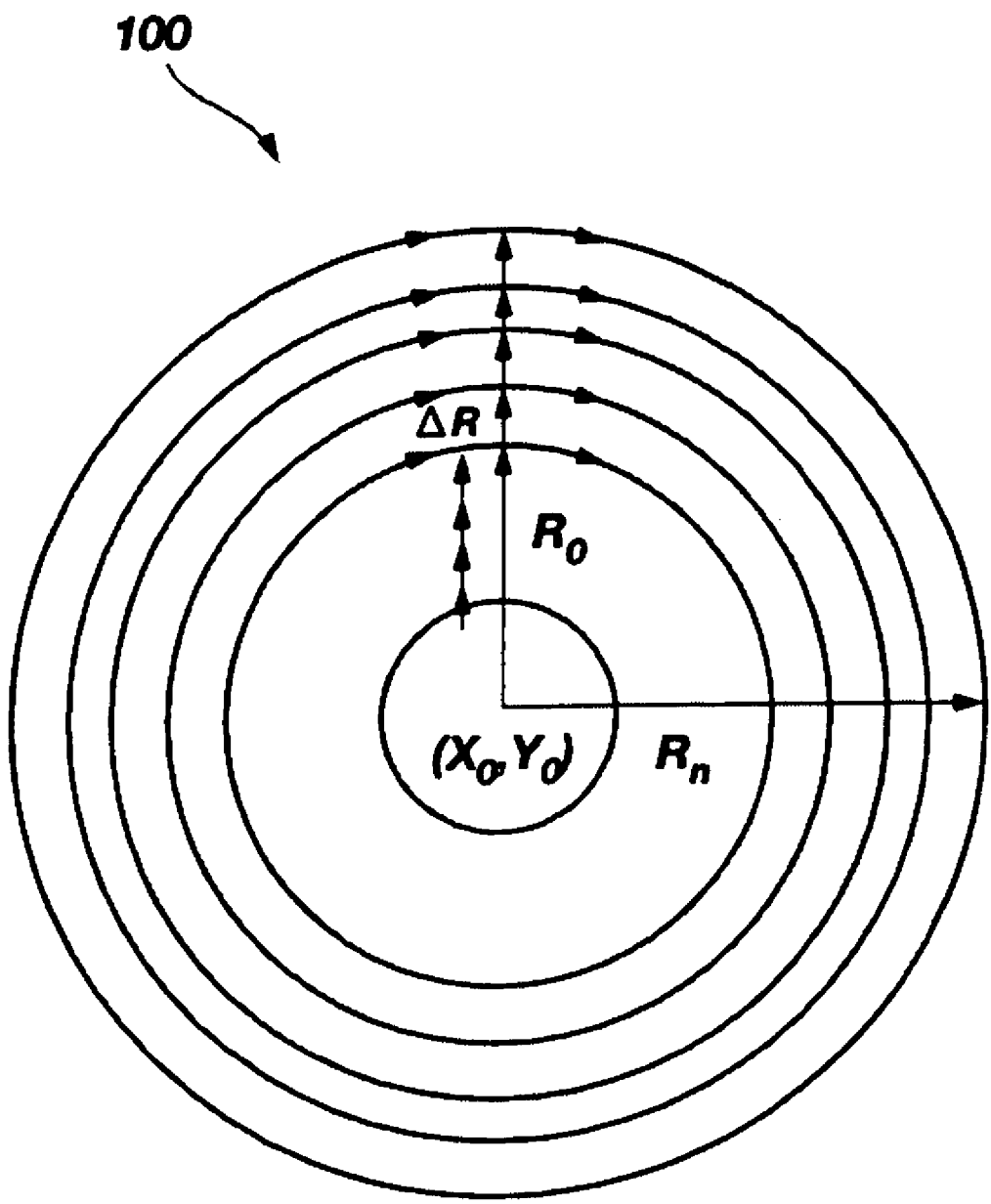
FIG. 6 is one embodiment of a concentric circular raster of the optical disc labeling system of FIG. 1.

In one embodiment, a concentric circular track 60 is correlated to a rectangular image and continuous-tone pixel values of the rectangular image corresponding to marking locations along this raster are computed. FIG. 6 illustrates one embodiment of a concentric circular raster of the optical disc labeling system 10. For illustrative purposes, the number of concentric circles is reduced and the spacing between the circles is increased. An inner radius of the raster is $R_0$ and the outer radius is $R_n$, wherein n represents a number of concentric circular rasters. Since the optical disc rotates counterclockwise when viewed from the writing side, the tracks are marked clockwise.

The marking control stage (box 86) of the imaging pipeline 80 of FIG. 5 augments the halftoned curved raster data with laser control data, which may be processed by the controller 26 of FIG. 1 to move the laser beam 16 and other mechanism control commands, such as commands to move the optical disc 14 with the disc spindle motor 17 and the sled 19 with the sled motor 21. These data and commands control the optical disc labeling system's 10 labeling along the concentric circular tracks or the continuous spiral track on the label surface of the optical disc 14. Further, synchronization commands may be inserted at appropriate locations in a label file of software implemented to control the optical disc labeling system 10 in order to synchronize the laser beam 16 control with any other necessary mechanism movements of components of the optical disc labeling system 10.

Depending on the specific system architecture, the image pipeline 80 (FIG. 5) components of the optical disc labeling system 10 may be implemented by the host driver, the firmware or hardware of the optical disc labeling system 10, or any combination thereof.

In another embodiment, the method for converting a source rectangular raster image to a curved raster may be used with a continuous tone printer that includes curved rasters. In this embodiment, the method includes designating a marking location on a curved track, such that each marking location corresponds to a substantially uniformly spaced interval along the curved track. The method includes designating a location of the marking location in a coordinate system, such as a radial-tangential coordinate system, wherein the marking location is computed from one or more rectangular raster image pixels. For continuous tone printing without halftoning, it is typically more appropriate to interpolate or average over a corresponding local region of the source image than the "nearest neighbor" method utilized for binary printing. A representative value of each marking location is computed from the rectangular raster image, thus converting the rectangular raster image into a curved raster print.

In yet another embodiment, the method for converting a source rectangular raster image onto a curved raster may be used on a display element that includes curved rasters. In this embodiment, the method includes designating a location of a marking location, such as a display pixel on a curved raster, such that each display pixel corresponds to a substantially uniformly spaced interval along the curved raster. The method includes specifying the location of the display pixels in a coordinate system, such as a radial-tangential coordinate system, wherein a display pixel is computed from one or more source rectangular raster image pixels. For continuous tone displays, it may be appropriate to interpolate or average over a corresponding local region of the source rectangular raster image than the "nearest neighbor" method utilized for binary printing. A representative value of each display pixel may be computed from the source rectangular raster image, thus converting the source rectangular raster image onto a curved raster display.

The method of displaying the source rectangular raster image on the display element having curved rasters may also include performing image enhancement, scaling, and dithering on the source image's rectangular rasters, and rendering the dithered result on the display's curved raster or rasters.

Figure 7:
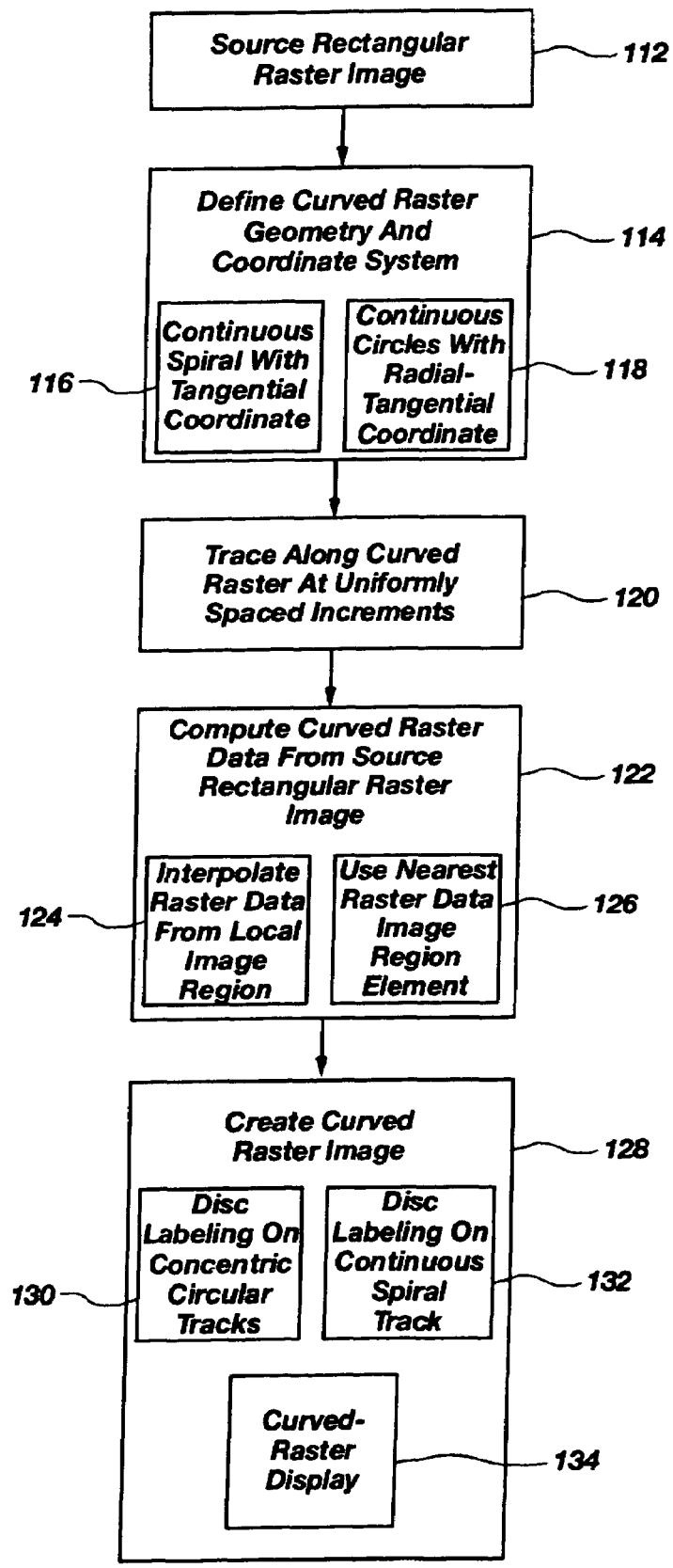
FIG. 7 depicts a flowchart of acts of one embodiment of a method of converting a source rectangular raster image to a curved raster of the present invention.

Referring now to FIG. 7, there is illustrated a flowchart depicting acts of one embodiment of a method of converting a source rectangular raster image to a curved raster image generally at 110 that may be employed by the optical disc labeling system 10 of FIG. 1. The method includes providing the source rectangular raster image at box 112. In one embodiment, the source rectangular raster image contains halftoned data, and at least portions of the method 110, such as boxes 114-126, may be performed by the rectangular to curved converter of box 85 (FIG. 5). The method also includes defining the curved raster geometry and coordinate system at box 114. In one embodiment, the curved raster geometry and coordinate system are defined in a continuous spiral with a tangential coordinate, at box 116, and in another embodiment, the curved raster geometry and coordinate system are defined in concentric circles with radial-tangential coordinates, at box 118.

The method further includes tracing along the curved raster generated by the optical disc labeling system 10 at uniformly spaced increments at box 120 and computing curved raster data from the source rectangular raster image at box 122. The curved raster data may be computed from the source rectangular raster image with different embodiments including interpolating raster data from a local image region at box 124 or employing a nearest raster data image region element at box 126. The method also includes creating a curved raster image at box 128. The curved raster image may be created on the optical disc 14 by forming marks at appropriate marking locations on a set of concentric circular tracks at box 130, by forming marks at appropriate marking locations on a continuous spiral track at box 132, or by displaying the curved raster on a display element at box 134.

In another embodiment, the curved raster may be traced along a non-uniform, periodic spacing in addition to or in place of the uniformly spaced increments at box 120. For instance, in some marking systems, the native marking resolution of the system may not support average mark spacing. In these systems, the spacing of the marks may be alternated in order to achieve the average mark spacing.

The embodiments described herein are illustrative of how the optical disc labeling system of the present invention is able to adapt rectangular halftoning techniques to curved rasters for disc labeling or displaying on a display element including a curved raster. Although the present invention has been shown and described with respect to various exemplary embodiments, various additions, deletions, and modifications that are obvious to a person of ordinary skill in the art to which the invention pertains, even if not shown or specifically described herein, are deemed to lie within the scope of the invention as encompassed by the following claims.

What is claimed is:

1. A method for converting a rectangular raster image to a curved raster image, comprising:
   providing the rectangular raster image;
   defining a curved raster geometry and coordinate system on a curved track, thus forming a curved raster;
   tracing along the curved raster to define a plurality of data locations;
   computing curved raster data for each of the plurality of data locations from the rectangular raster image, thus creating the curved raster image, wherein computing the curved raster data from the rectangular raster image comprises one or more of:
   interpolating the curved raster data from a local image region of the rectangular raster image; and,
   selecting data from the rectangular raster image having a corresponding position that is nearest data on the curved raster.

2. The method according to claim 1, wherein the rectangular raster image comprises halftoned data.

3. The method according to claim 1, wherein the rectangular raster image comprises continuous toned data, the method further comprising:
   halftoning the continuous toned data to form halftoned data.

4. The method according to claim 1, wherein defining the curved raster geometry and coordinate system comprises defining a continuous spiral with a tangential coordinate system.

5. The method according to claim 1, wherein defining the curved raster geometry and coordinate system comprises defining at least one concentric circle with a radial-tangential coordinate system.

6. The method according to claim 1, wherein the tracing includes tracing the curved raster along uniformly spaced increments.

7. The method according to claim 1, wherein the tracing includes tracing the curved raster along periodic spaced increments.

8. The method according to claim 1, wherein creating the curved raster image comprises forming a mark on at least one concentric circular track of an optical disc, forming a mark on a continuous spiral track of an optical disc, or displaying the curved raster image on a display element.

9. A method for creating a label image on an optical disc, the method comprising:
   defining a curved raster geometry and coordinate system, thus producing a curved raster;
   tracing along the curved raster;
   converting data of a rectangular raster image to data on the curved raster in the coordinate system;
   designating a plurality of data locations along the curved raster; and
   forming a mark or not forming a mark on the plurality of data locations of the curved raster on the optical disc, thus creating the label image,
   wherein converting the data of the rectangular raster image to the data on the curved raster in the coordinate system of the label side of the optical disc comprises one or more of:
      selecting a value of the data of the rectangular raster image that is nearest one of the plurality of data locations of the curved raster and designating the value of the data of the rectangular raster image as the value of the one of the plurality of data locations of the curved track; and
      interpolating the curved raster data from a local image region of the rectangular raster image.

10. The method according to claim 9, wherein tracing along the curved raster comprises:
   rotating the optical disc; and
   radially moving a beam of light in relation to the optical disc.

11. The method according to claim 9, wherein designating the plurality of data locations along the curved raster and the coordinate system comprises designating the plurality of data locations along a continuous spiral track in a tangential coordinate system.

12. The method according to claim 9, wherein designating the plurality of data locations along the curved raster and the coordinate system comprises designating the plurality of data locations along at least one concentric circular track in a radial-tangential coordinate system.

13. The method according to claim 9, wherein forming the mark comprises exposing the marking location to a beam of laser light.

14. The method according to claim 9, wherein the plurality of data locations are substantially, uniformly spaced on the curved track or spaced along periodic increments on the curved track.

15. An apparatus for creating a label image on an optical disc, comprising:
   a source for generating a beam of energy;
   an arrangement configured to radially and tangentially move the source relative to a label side of an optical disc;
   a controller configured to generate signals to control the source and the arrangement, wherein the controller is operatively configured to:
      direct the arrangement to trace a curved track adjacent the optical disc;
      compute curved raster data from a source rectangular raster image, thus creating a curved raster image; and
      periodically operate the source to form a plurality of marks on the curved raster of the optical disc corresponding to the curved raster image, thus creating the label image,
   wherein the controller is to compute the curved raster data from the source rectangular raster image by one or more of:
      interpolating the curved raster data from a local image region of the source rectangular raster image; and,
      selecting data from the source rectangular raster image having a corresponding position that is nearest data on the curved raster.

16. The apparatus of claim 15, wherein the source generates a laser beam.

17. The apparatus of claim 15, wherein the source is configured to radially move in relation to the optical disc.

18. The apparatus of claim 15, wherein the arrangement comprises a moveable sled mounted to the source, a sled motor coupled to the sled an configured to move the sled radially relative to the optical disc, and a spindle motor coupled to the optical disk and configured to rotate the optical disc so as to tangentially move the disc relative to the source.

19. The apparatus of claim 15, wherein the controller for generating signals is further operatively configured to receive the image source from a computer system.

20. A computer-readable storage medium comprising computer readable code embodied in the medium for converting a source rectangular raster image to a curved raster image, the computer readable code in the medium comprising:
   computer readable program code configured to cause the computer to define a curved raster geometry and coordinate system on a curved track, thus forming a curved raster;
   computer readable program code configured to cause the computer to trace along the curved raster;
   computer readable program code configured to cause the computer to compute curved raster data from the source rectangular raster image; and
   computer readable program code configured to cause the computer to create the curved raster image, wherein one or more of:
   the curved raster data is computed from the source rectangular raster image by interpolating the curved raster data from a local image region of the source rectangular raster image; and,
   the curved raster data is computed from the source rectangular raster image by selecting data from the source rectangular raster image having a corresponding position that is nearest data on the curved raster.

21. The computer-readable storage medium of claim 20, wherein the curved raster geometry and coordinate system are defined in a continuous spiral with a tangential coordinate system.

22. The computer-readable storage medium of claim 20, wherein the curved raster geometry and coordinate system are defined in at least one concentric circle with a radial-tangential coordinate system.

23. The computer-readable storage medium of claim 20, wherein the curved raster is traced along uniformly spaced increments.

24. The computer-readable storage medium of claim 20, wherein the curved raster is traced along periodic spaced increments.

25. The computer-readable storage medium of claim 20, wherein the curved raster image is created by forming a mark on at least one concentric circular track of an optical disc, forming a mark on a continuous spiral track of an optical disc, or displaying the curved raster image on a display element.

26. An optical disc adapted to contain a label formed thereon from a source image having a rectangular raster, comprising:
   an imaging layer adapted to display visually contrasting marks therein;
   a plurality of marking locations definable on the imaging layer in a curved raster, selected ones of the plurality of marking locations adapted to contain the marks, the selected ones definable by converting the source image from the rectangular raster to the curved raster, the source image converted from the rectangular raster by one or more of:
      interpolating the curved raster data from a local image region of the rectangular raster image; and,
      selecting data from the rectangular raster image having a corresponding position that is nearest data on the curved raster.

27. The optical disc of claim 26, wherein the curved raster comprises a continuous spiral with a tangential coordinate system.

28. The optical disc of claim 26, wherein the curved raster comprises at least one concentric circle with a radial-tangential coordinate system.

29. The optical disc of claim 26, wherein the marks are placed at uniformly spaced increments.

30. The optical disc of claim 26, wherein the marks are placed at periodic spaced increments.

31. The optical disc of claim 26, wherein the marks produce a monochromatic image.

32. A method for generating a curved raster image, the method comprising:
   providing a rectangular raster image;
   defining a curved raster geometry and coordinate system on a curved track, thus forming a curved raster;
   tracing along the curved raster to define a plurality of data locations;
   a step for converting the rectangular raster image to the plurality of data locations on the curved raster; and
   creating the curved raster image,
   wherein the step for converting the rectangular raster image to the plurality of data locations on the curved raster comprises one or more of:
      interpolating the plurality of data locations on the curved raster from one or more local image regions of the rectangular raster image; and,
      selecting data from the rectangular raster image having corresponding positions that are nearest the plurality of data locations on the curved raster.

33. The method according to claim 32, wherein defining the curved raster geometry and coordinate system comprises defining a continuous spiral with a tangential coordinate system.

34. The method according to claim 32, wherein defining the curved raster geometry and coordinate system comprises defining at least one concentric circle with a radial-tangential coordinate system.

35. The method according to claim 32, wherein the curved raster is traced along uniformly spaced increments.

36. The method according to claim 32, wherein the curved raster is traced along periodic spaced increments.

37. The method according to claim 32, wherein creating the curved raster image comprises forming a mark on at least one concentric circular track of an optical disc, forming a mark on a continuous spiral track of an optical disc, or displaying the curved raster image on a display element.

38. An image pipeline for converting a continuous-tone rectangular raster image to a curved raster image, comprising:
   a rectangular raster halftoner configured to halftone the continuous-tone rectangular raster image so as to form a halftoned rectangular raster image; and
   a raster mapper configured to map the halftoned rectangular raster image from a rectangular coordinate system to a radial-tangential coordinate system so as to form the curved raster image, the raster mapper further configured to map a curved raster onto the rectangular raster image and one or more of:
      identify a location in the halftoned rectangular raster image that is nearest each corresponding mapped location on the curved raster, and designate the data of the location in the halftoned rectangular raster image as the data for the corresponding mapped location on the curved raster; and
      identify a local image region in the halftoned rectangular raster image that is nearest each corresponding mapped location on the curved raster, and interpolate the data of the local image region to define the data for the corresponding mapped location on the curved raster.

39. An image pipeline for converting a rectangular raster image to a curved raster image, comprising:
   means for providing the rectangular raster image;
   means for defining a curved raster geometry and coordinate system on a curved track, thus forming a curved raster;
   means for tracing along the curved raster to define a plurality of data locations;
   means for computing curved raster data for each of the plurality of data locations from the rectangular raster image, thus creating the curved raster image,
   wherein the means for computing the curved raster data comprises one or more of:

means for interpolating the curved raster data from a local image region of the rectangular raster image; and, means for selecting data from the rectangular raster image having a corresponding position that is nearest data on the curved raster.

40. The image pipeline of claim 39, wherein the rectangular raster image comprises continuous tone data, further comprising:

means for halftoning the continuous tone data to form halftoned data.

\* \* \* \* \*

UNITED STATES PATENT AND TRADEMARK OFFICE
CERTIFICATE OF CORRECTION

PATENT NO.       : 7,639,271 B2                                                    Page 1 of 1
APPLICATION NO.  : 10/836167
DATED            : December 29, 2009
INVENTOR(S)      : Paul J. McClellan It is certified that error appears in the above-identified patent and that said Letters Patent is hereby corrected as shown below:

In column 11, line 55, in Claim 9, after "and" insert -- , --.

In column 12, line 45, in Claim 18, delete "as" and insert -- and --, therefor.

Signed and Sealed this

Twenty-first Day of September, 2010

David J. Kappos
*Director of the United States Patent and Trademark Office*